United States Patent [19]

Au et al.

[11] Patent Number: 5,608,833
[45] Date of Patent: Mar. 4, 1997

[54] FOCAL-PLANE DETECTOR IMAGING SYSTEM WITH IMPROVED OPTICAL DAMAGE THRESHOLD

[75] Inventors: Anson Y. G. Au, Los Angeles; Shin-Tson Wu, Northridge, both of Calif.

[73] Assignee: Hughes Electronics, Los Angeles, Calif.

[21] Appl. No.: 490,917

[22] Filed: Jul. 20, 1995

[51] Int. Cl.⁶ ............................... G02B 6/06; G02F 1/13
[52] U.S. Cl. .................... 385/116; 385/115; 385/119; 385/120; 349/65
[58] Field of Search .................... 385/115, 116, 385/119, 120, 121, 15, 16; 359/42, 36, 40, 48, 49, 41

[56] References Cited

U.S. PATENT DOCUMENTS

| | | | |
|---|---|---|---|
| 4,076,378 | 2/1978 | Cole | 385/115 X |
| 4,099,833 | 7/1978 | Tosswill | 385/120 X |
| 4,570,063 | 2/1986 | De Bie et al. | 385/115 |
| 4,601,537 | 7/1986 | Saccocio | 385/115 |
| 5,150,445 | 9/1992 | Toyoda et al. | 385/116 |
| 5,159,656 | 10/1992 | Goldstein | 385/116 |
| 5,394,254 | 2/1995 | Cheng | 359/42 |

*Primary Examiner*—Brian Healy
*Attorney, Agent, or Firm*—Vijayalakshmi D. Duraiswamy; Wanda K. Denson-Low

[57] ABSTRACT

A focal-plane detector imaging system that can tolerate higher intensity optical beams than prior systems, without a reduction in the system's field-of-view, comprises an imaging lens, a fiber optic array positioned at the image plane of the imaging lens and an image detector positioned at the output end of the fiber optic array. The optical fibers that make up the fiber array have core diameters that are larger than the focal spot of an incoming optical beam. In operation, the fiber array transfers the imaged scene to the image detector at its output end. The focused optical beam is also transferred to the image detector at the array's output end, but its diameter is enlarged due to its angular divergence. In a preferred embodiment, the f-number of the imaging lens, diameter of the fiber cores, and the lengths of the fibers in the array are designed so that, as the power of an incoming optical beam increases, the optical damage threshold of the fiber array is reached before that of the image detector. An LCLV imaging system that incorporates the present invention is also provided.

12 Claims, 2 Drawing Sheets

FOCAL-PLANE DETECTOR IMAGING SYSTEM WITH IMPROVED OPTICAL DAMAGE THRESHOLD

This invention was made with Government support under Contract N62269-93-C-0241 awarded by the Navy. The Government has certain rights in this invention.

BACKGROUND OF THE INVENTION

1. Field of the Invention

This invention relates to imaging systems, and more particularly to a focal-plane detector imaging system that is resistant to potentially damaging high intensity optical beams.

2. Description of the Related Art

Imaging systems with focal plane detectors are used in devices that are designed to protect the human eye from exposure to potentially damaging optical radiation, particularly laser radiation. One such device is described in U.S. Pat. No. 5,081,542, entitled "LIQUID CRYSTAL LIGHT VALVE GOGGLES FOR EYE PROTECTION", issued Jan. 14, 1992 to Uzi Efron et al., and assigned to Hughes Aircraft Company, the assignee of the present invention.

In this device, an imaging lens images a scene under observation onto a photoconductive liquid crystal light valve (LCLV). The LCLV reproduces the imaged scene in a spectral range to which the human eye is sensitive. The observer views the reproduced scene and is thereby shielded from potentially harmful optical radiation.

The image detectors that are used in these eye-protection devices, such as the LCLV used in the device described above, typically have relatively low optical damage thresholds. Since the image detector is positioned at the image plane of the imaging lens, an incoming optical beam will be focused onto the image detector. The resulting optical intensity can very easily damage the detector and render the imaging device inoperative. One way to reduce the optical intensity at the image detector is to increase the diameter of the focused optical beam (increase the focal spot diameter), which can be accomplished by using an imaging lens with a high f-number. However, as the f-number of the imaging lens is increased, the field-of-view of the device is reduced.

SUMMARY OF THE INVENTION

In view of the above problems, the present invention provides a focal-plane detector imaging system that can tolerate higher intensity optical beams than prior systems, without a reduction in the field-of-view.

This is accomplished by providing an imaging lens, a fiber optic array positioned at the image plane of the imaging lens and an image detector positioned at the output end of the fiber optic array. The optical fibers that make up the fiber array have core diameters that are larger than the focal spot of an incoming optical beam.

In operation, the fiber array transfers the imaged scene to the image detector at its output end. The focused optical beam is coupled into one of the fibers of the array and is also transferred to the image detector at the array's output end. The angular divergence of the optical beam causes its diameter to increase as it propagates through the fiber. The length of the optical fibers in the array are designed so that, at the output end of the array, the diameter of the optical beam substantially equals the diameter of the fiber that guided it. The larger optical beam diameter results in lower optical intensity at the image detector.

In a preferred embodiment, the fiber array comprises a twisted fiber array that flips the imaged scene by 180 degrees before it reaches the image detector, thereby compensating for the image inversion caused by the imaging lens. Since the fiber array is typically less expensive to replace than the image detector, the f-number of the imaging lens and the diameter of the fiber cores are preferably designed so that, as the power of an incoming optical beam increases, the optical damage threshold of the fiber array is reached before that of the image detector. In addition, the fiber core diameters are preferably smaller than the image resolution of the image detector, so that the resolution of the imaging device is not limited by the fiber core diameters.

A preferred LCLV imaging system that incorporates the present invention includes an objective lens for imaging the observed scene at an image plane, a twisted fiber array positioned at the image plane of the imaging lens, and a reflective photoconductive LCLV positioned at the output end of the fiber array.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
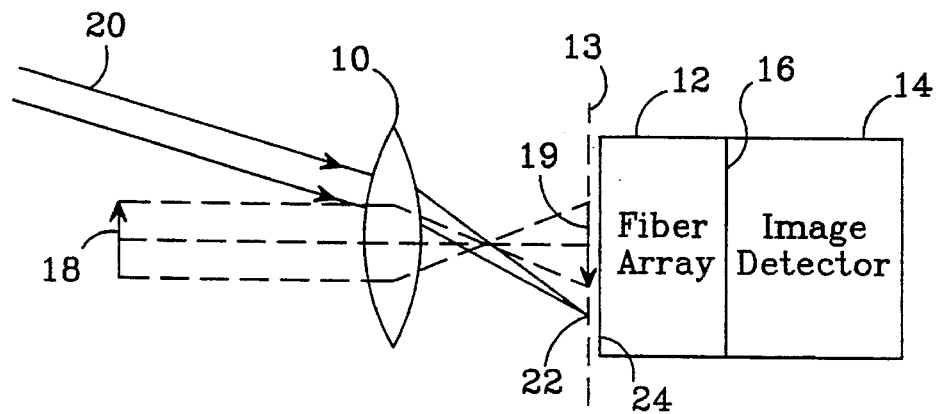
FIG. 1 is a schematic diagram illustrating the basic principles of the invention.

FIG. 1 illustrates the basic principles of the invention. An imager, preferably a lens 10, is used to image a scene under observation. A fiber array 12 is positioned at the image plane 13 of lens 10 and an image detector 14 is positioned at the output end 16 of the fiber array 12. In FIG. 1, the image plane 13 is shown slightly offset from the input end 24 of fiber array 12 for ease of illustration. In practice, the array's input end 24 and the image plane 13 lie in substantially the same plane. The fiber array is comprised of an array of individual glass optical fibers (not shown) that are fused together to form a glass plate. Fiber arrays are well known and are commercially available from, for example, Galileo Optics.

In operation, a scene under observation (represented by arrow 18) is imaged at image plane 13. In practice, the distance from scene 18 to lens 10 is large enough relative to the focal length of lens 10 that the image plane 13 is located at the lens' focal plane. The image 19 will generally extend over a number of fibers in the array 12, so that each illuminated fiber captures a portion of image 19 (an image pixel) and guides it to the array's output end 16, where it is detected by image detector 14.

Figure 2:
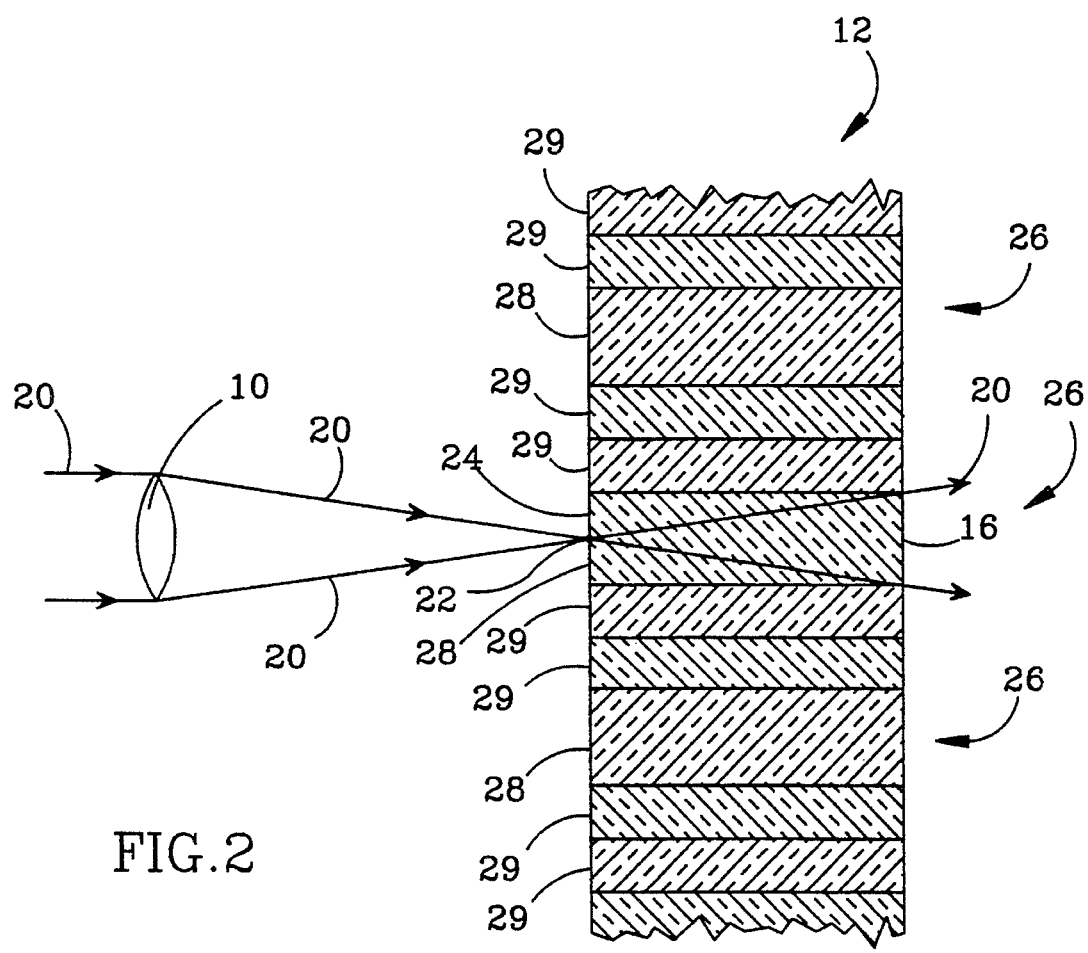
FIG. 2 is a sectional view of the fiber array of FIG. 1.

If a collimated optical beam 20, such as a laser beam powerful enough to damage the user's eyes, is directed towards lens 10, it is focused to a spot 22 at the focal plane (the image plane 13 in practice) of lens 10. The fiber array 12 is chosen so that the individual fibers (not shown) have core diameters that are larger than the expected diameter of beam 20 at image plane 13 (the focal spot 22 in practice). The term "collimated optical beam" does not necessarily refer to a beam made up of perfectly parallel rays (or a perfectly planar wavefront). Rather the term is used to refer to an optical beam with a wavefront that is sufficiently planar at lens 10 to be focused to a spot 22 that is smaller than the core diameter of the fibers in array 12. Beam 20 is captured by one of the fibers in the array 12 and guided to the array's output end 16, as illustrated in FIG. 2. The divergence of beam 20 as it propagates through the core 28 of one of the fibers 26 causes its diameter to increase. The length of the fibers 26 in array 12 are chosen so that, at the array's output end 16, the diameter of beam 20 substantially equals the diameter of the fiber 26 that guided it. The fiber array 12 is chosen so that each individual fiber 26 has a core 28 with a diameter that is larger than the diameter of beam 20 at the array's input end 24, with each fiber core 28 surrounded by the fiber's cladding 29. In the preferred embodiment, the fiber core and cladding are made of silica. When the array's input end 24 is positioned at the focal spot 22 of beam 20, and when the beam's propagation direction is parallel to the fiber's logitudinal axis (0 degree angle of incidence), the beam's diameter ($\omega$) at the array's output end 16 is a function of the length (Z) of the fiber 26 that guides it, and can be calculated with the following expression:

$$\omega(z) = \omega_0 \sqrt{1 + \left[\frac{\lambda z}{\pi \omega_0}\right]^2} \quad (1)$$

where $\omega_0$ is the beam diameter at focal spot 22 and $\lambda$ is the beam's wavelength. The length (Z) of each fiber 26 in the array is preferably chosen so that the diameter of an optical beam 20 that is incident on the array with a 0 degree angle of incidence has a diameter that is substantially equal to the diameter of the fiber core 28 at the array's output end 16. For example, if $\omega_0$ is 2.5 microns, the wavelength of beam 20 is 0.55 microns, and the diameter of the fiber core is 10 microns, then the length of fiber 26 must be at least approximately 143 microns for beam 20 (with a 0 degree angle of incidence) to have a diameter that is equal to the core diameter (10 microns) at the array's output end 16.

Optical beams that are incident on the fiber 26 at oblique angles (with propagation directions that are not parallel to the fiber's longitudinal axis) will internally reflect from the sides of the fiber core 28 and will travel longer distances than a beam that is incident on the fiber 26 at 0 degrees. Therefore, their diameters will also equal the diameter of the fiber core 28 at the array's output end.

The increased beam diameter results in lower optical intensity at the array's output end 16 than at the input end 24, which reduces the optical intensity experienced by image detector 14. On the other hand, the image of scene 18 will spread over the input areas of the multiple fibers in the array 12. The detection system thus detects normal intensity image beams without significant loss of intensity, while at the same time greatly reducing the intensity of high power laser beams.

If optical beam 20 fills the entire aperture of lens 10, and has a Gaussian intensity profile, lens 10 will focus it to a diffraction-limited spot size $\omega_0$ given by:

$$\omega_0 = \frac{2\lambda(f\#)}{\pi} \quad (2)$$

where f# is the f-number of the lens. For a lens 10 with an f-number of 1.25, an optical beam 20 with a wavelength of 0.53 microns that fills the entire aperture of lens 10, beam 20 will focus down to a diffraction-limited spot size of 0.42 microns. In practice, the diffraction-limited spot size cannot be achieved because of lens tolerances. The applicants have found that the above parameters will yield a spot size of 1 micron at the array's input side 24.

For a 1 micron spot size at the array's input side 24, and a fiber core diameter of 5 microns, the optical intensity at the array's output side 16 will be 25 times less than the intensity at the array's input side 24. This is because the optical intensity is inversely proportional to the square of the radius of optical beam 20. In the preferred embodiment, the f-number of lens 10 and the diameters of the fibers in the fiber array 12 are chosen so that as the power of beam 20 increases, the optical intensity at the array's input end 24 will exceed the array's damage threshold before the optical intensity at the array's output end 16 exceeds the damage threshold of image detector 14. If a sufficient number of fibers in the fiber array 12 are optically damaged during operation, the array 12 may be replaced. Replacing the fiber array 12 will typically be much less costly than replacing the image detector 14.

Figure 3:
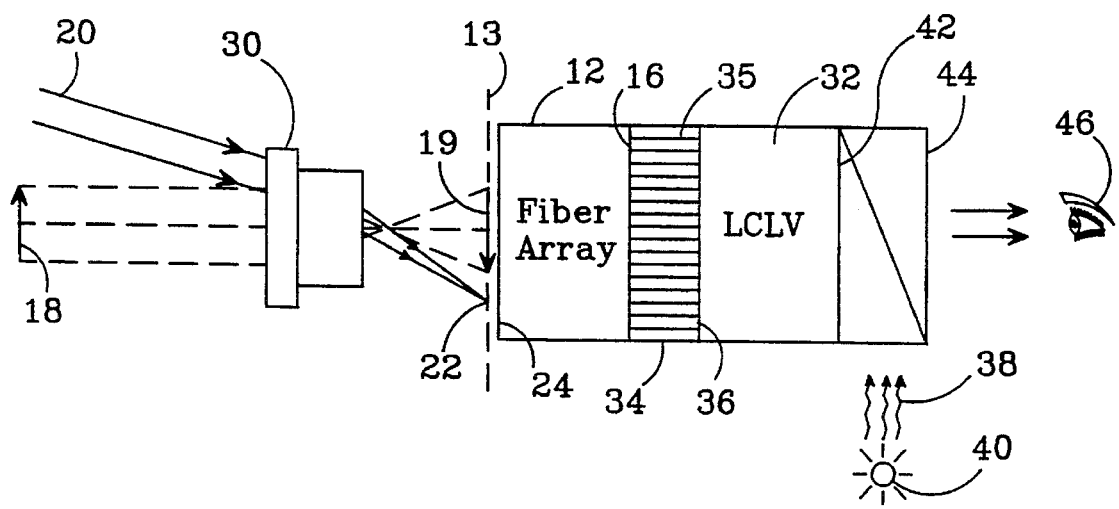
FIG. 3 is a schematic diagram illustrating a preferred LCLV imaging system that incorporates the present invention.
Figure 4:
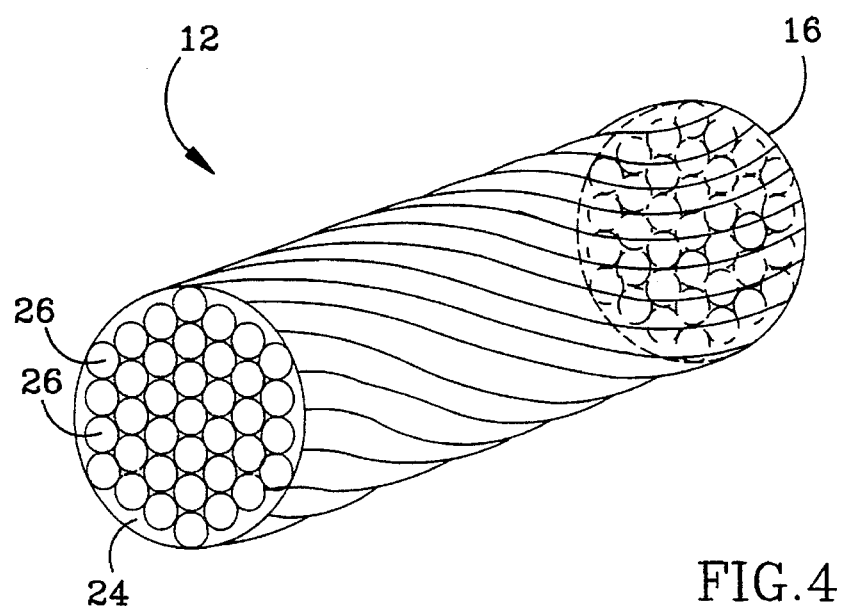
FIG. 4 is a perspective view of a twisted fiber array used in the embodiment of FIG. 3.

FIG. 3 illustrates an LCLV imaging system that incorporates the present invention. An objective lens 30 is used as the imaging lens. As explained above, the observed scene 18 is imaged at the input end 24 of a fiber array 12. As in FIG. 1, the image plane 13 is shown slightly offset from the array's input end 24 for illustration purposes only. The fiber array operates as described above in connection with FIGS. 1 and 2. The image 19 is guided along the fibers that make up the array 12 to the array's output end 16. The fiber array 12 is preferably a twisted fiber array, as illustrated in FIG. 4, in which the fibers 26 that make up the array are twisted about the array's longitudinal axis so that the orientation of the image at the output end 16 of the array 12 is inverted with respect to its orientation at the input end 24 of the array 12. This compensates for the optical inversion produced by lens 30. Twisted fiber arrays are also commercially available from Galileo Optics.

A reflective photoconductive LCLV 32 is used as the image detector. The design and construction of a suitable photoconductive LCLV is described in U. Efron et al., "The Silicon Liquid-Crystal Light Valve", *Journal of Applied Physics*, Vol. 57, No. 4, Feb. 15, 1985, pp. 1356–1368. The operation of the LCLV in an eye-safe imaging system is described U.S. Pat. No. 5,081,542, mentioned above. The LCLV 32 typically includes a fiber optic face plate 34 that is permanently attached to the write side 36 of the LCLV 32 during its construction. The fiber face plate 34 is similar to the fiber array 12 in that it is also comprised of a set of individual fibers 35 that are fused together. The face plate 34, like the fiber array 12 described above, breaks the incoming image up into individual image pixels and guides them to the LCLV's photoconductor. The fibers in face plate 34 preferably have core diameters that are no greater than the image resolution of the LCLV 32.

The face plate 34 is attached directly to the fiber array 12 with an index matching fluid (not shown). In operation, the image at the array's output end 16 is coupled into the fiber face plate 34, which guides the image to the write side 36 of the LCLV 32. The core diameters of the fibers in the fiber array are preferably no greater than the core diameters of the fibers in the face plate 34. In this way, the resolution of the device is limited only by the core diameters of the fibers in face plate 34. In the preferred embodiment, the core diameters of the fibers in both the array 12 and face plate 16 are 10 microns, which is smaller than the image resolution of typical LCLVs.

Because the intensity of optical beam 20 is greater at the array's input side 24 than at its output side 16, the optical damage threshold of fiber array 12 will be reached before that of face plate 34. This is advantageous because, if the LCLV's face plate 34 is damaged, the entire LCLV assembly must be replaced.

The LCLV 32 is preferably read out in a conventional manner by directing readout light 38 from a light source 40 to the LCLV's readout side 42 with prism 44. The LCLV 32 imparts the image onto the readout light 38 and reflects the readout light back through prism 44 to a viewer 46.

Numerous variations and alternate embodiments will occur to those skilled in the art without departing from the spirit and scope of the invention. Although an imaging system with a LCLV detector is disclosed as an illustrative example, the invention may be implemented in any imaging system in which the detector is susceptible to optical damage, such as those that use conventional silicon focal-plane arrays. Such variations and alternate embodiments are contemplated, and can be made without departing from the spirit and scope of the appended claims.

We claim:

1. An imaging system that is resistant to high intensity optical beams, comprising:

an imager positioned to create an image of a scene at an image plane, and to focus an incident collimated optical beam onto a focal plane that is in close proximity to said image plane, said imager having an f-number and said fiber cores having diameters such that, as the power of said beam increases, its optical intensity at the fiber array's input end reaches an optical damage threshold for said array before its optical intensity at the fiber array's output end reaches a damage threshold for said image detector, a fiber optic array having an input and output end, said input end positioned at said image plane so that the fiber array captures said image and optical beam and guides them to its output end, said array comprising a plurality of optical fibers with core diameters that are larger than the diameter of said focused optical beam at said image plane, so that said optical beam is captured by one of said fibers, and an optical image detector positioned at the output end of said array for detecting said image, wherein the lengths of said fibers are such that the diameter of said optical beam at the output end of the fiber array is substantially greater than its diameter at the input end of the fiber array.

2. An imaging system that is resistant to high intensity optical beams, comprising:

an imager positioned to create an image of a scene at an image plane, and to focus an incident collimated optical beam onto a focal plane that is in close proximity to said image plane, a fiber optic array having an input and output end, said input end positioned at said image plane so that the fiber array captures said image and optical beam and guides them to its output end, said array comprising a plurality of optical fibers with core diameters that are larger than the diameter of said focused optical beam at said image plane, so that said optical beam is captured by one of said fibers, and an optical image detector positioned at the output end of said array for detecting said image, wherein the lengths of said fibers are such that the diameter of said optical beam at the output end of the fiber array is substantially greater than its diameter at the input end of the fiber array, and wherein said image detector comprises a photoconductive liquid crystal light valve.

3. A liquid crystal light valve (LCLV) imaging system that is resistant to high intensity optical beams, comprising:

a lens having a predetermined f-number, positioned to create an image of an object at an image plane, and to focus an incident collimated optical beam onto a focal plane that is in close proximity to said image plane, a fiber optic array having an input and output end, said input end positioned at said image plane so that the fiber array captures said image and optical beam and guides them to its output end, said array comprising a first set of optical fibers with core diameters that are larger than the diameter of said focused optical beam at said image plane, so that said optical beam is captured by one of said fibers, and a photoconductive LCLV having a photoconductive write side that is positioned at the output end of said fiber array, wherein the lengths of the fibers in said first set are such that the diameter of said optical beam at the output end of the fiber array is substantially greater than its diameter at the input end of the fiber array.

4. The LCLV imaging system of claim 3, wherein the lengths of said fibers in said first set are such that the diameter of said optical beam at the output end of the fiber array is substantially equal to the core diameter of the fiber that guided it.

5. The LCLV imaging system of claim 3, said lens having an f-number and said fiber cores having diameters such that, as the power of said beam increases, its optical intensity at the fiber array's input end reaches an optical damage threshold for said array before its optical intensity at the fiber array's output end reaches a damage threshold for said LCLV.

6. The LCLV imaging system of claim 5, wherein each fiber in said first set has a core diameter that is no greater than the image resolution of said LCLV.

7. The LCLV imaging system of claim 6, wherein each fiber in said first set has a core diameter of approximately 10 microns.

8. The LCLV imaging system of claim 5, wherein said first set of fibers are twisted about the fiber array's longitudinal axis, so that the image's orientation at the fiber array's output end is inverted with respect to its orientation at the fiber array's input end.

9. The LCLV imaging system of claim 5, further comprising:

a fiber optic face plate positioned between the fiber array's output end and the write side of said LCLV, for capturing said image and optical beam at the fiber array's output end and guiding them to the write side of said LCLV, said fiber optic face plate comprising a second set of optical fibers with respective core diameters that are no smaller than the core diameters of said first set of optical fibers.

10. The LCLV imaging system of claim 9, wherein each fiber in said second set has a core diameter that is no greater then the image resolution of said LCLV.

11. The LCLV imaging system of claim 10, wherein the fibers in said first and second sets have equal core diameters.

12. The LCLV imaging system of claim 11, wherein the fibers in said first and second sets have core diameters of approximately 10 microns.

\* \* \* \* \*